United States Patent [19]

Sperling

[11] Patent Number: 5,473,131
[45] Date of Patent: Dec. 5, 1995

[54] ARC WELDING OR CUTTING TORCH AND ELECTRODE HOLDER USED FOR SAME

[75] Inventor: Hermann Sperling, Bischofsheim, Germany

[73] Assignee: Alexander Binzel GmbH & Co. KG, Germany

[21] Appl. No.: 226,559

[22] Filed: Apr. 12, 1994

[30] Foreign Application Priority Data

Apr. 13, 1993 [DE] Germany ............... 43 11 825.9
Apr. 29, 1993 [DE] Germany ............... 43 14 099.8

[51] Int. Cl.$^6$ ................................ B23K 9/167
[52] U.S. Cl. ............................................. 219/75
[58] Field of Search ................................ 219/75

[56] References Cited

U.S. PATENT DOCUMENTS 2,550,495  4/1951  Pilia ........................... 219/75
3,250,889  5/1966  Himmelman ................ 219/75
3,510,622  5/1970  Himmelman ................ 219/75
4,924,065  5/1990  Vito ........................... 219/138

FOREIGN PATENT DOCUMENTS 0151100  8/1985  European Pat. Off.
900855   1/1954  Germany.
3435050  4/1986  Germany.

Primary Examiner—Clifford C. Shaw
Attorney, Agent, or Firm—Price, Heneveld, Cooper, DeWitt & Litton

[57] ABSTRACT

An arc welding or cutting torch has a torch body with a torch nozzle and a housing having a taper fit lock for an electrode holder. The housing includes a tapered bore section and a cylindrical bore section disposed rearwardly of the tapered bore section. An electrode holder has a frustoconical portion with rearwardly facing tapered surfaces which engage the tapered section of the housing and a cylindrical portion disposed rearwardly adjacent the frustoconical portion and engaging the cylindrical bore section of the holder.

6 Claims, 2 Drawing Sheets

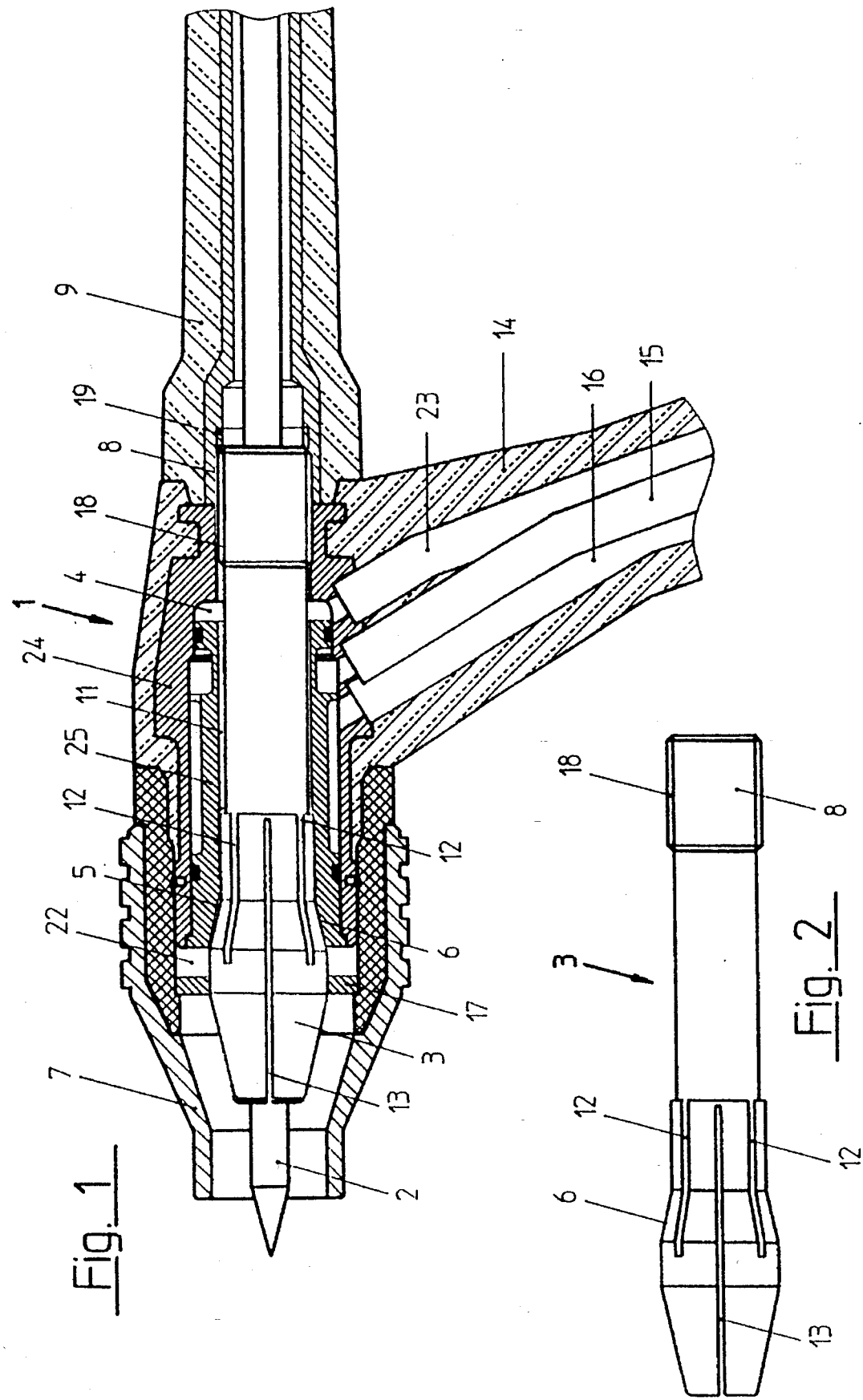

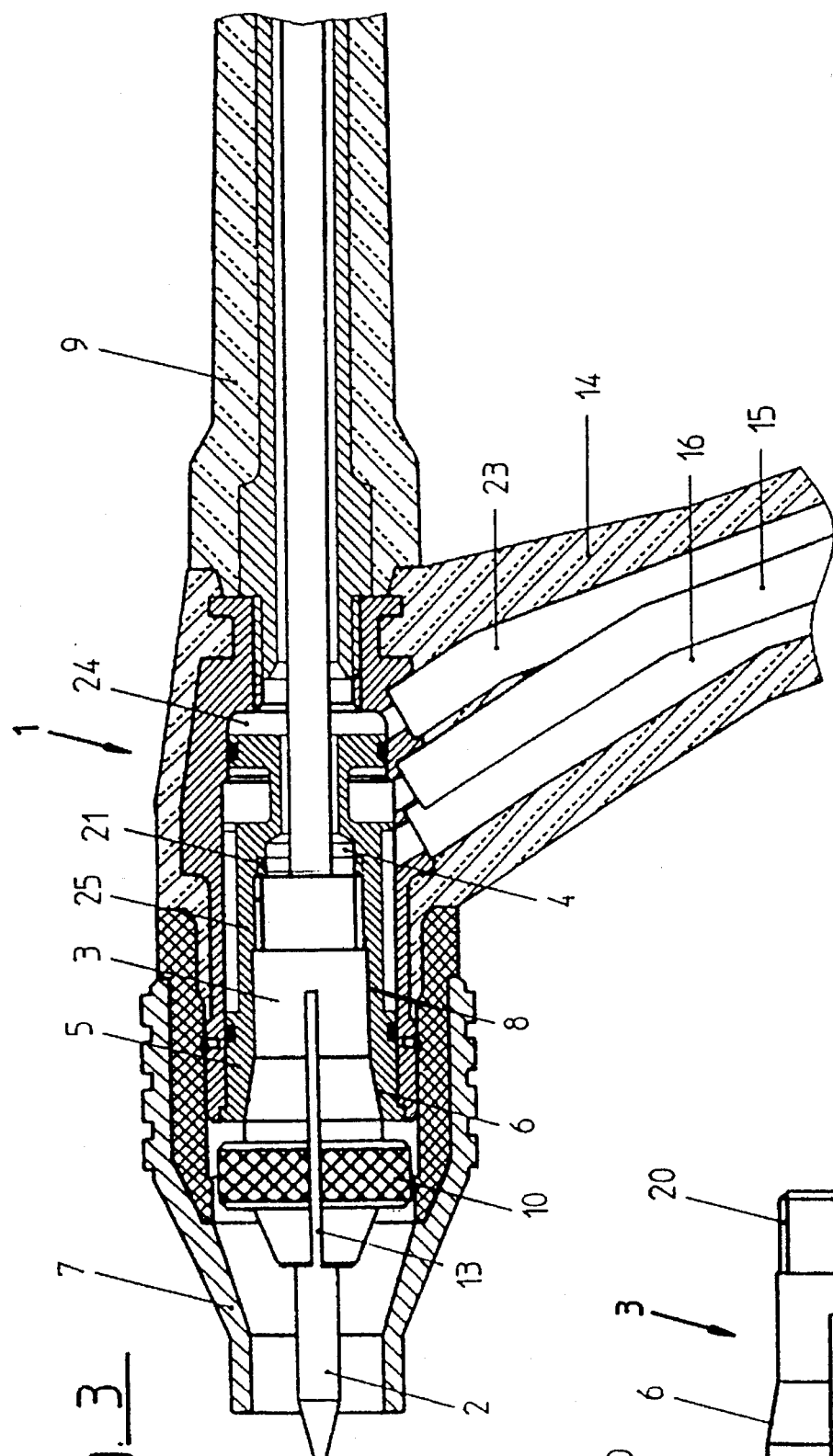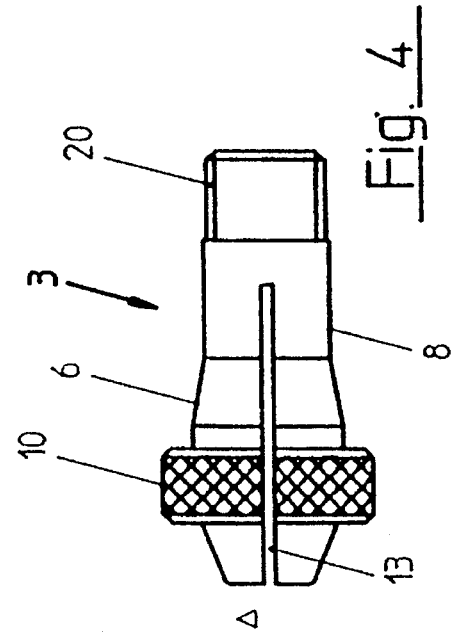

ARC WELDING OR CUTTING TORCH AND ELECTRODE HOLDER USED FOR SAME

BACKGROUND OF THE INVENTION

The invention applies to an arcwelding or cutting torch, like a WIG or plasma torch, with an electrode fastened in an electrode holder, which in turn is incorporated in a housing within the torch body.

An essential component of arcwelding or cutting torches is the electrode holder, which conducts the current for generating the arc to the electrode. The electrode holder is located in a housing within the torch body, while the electrode is fastened in the electrode C) holder. To accommodate electrodes of various diameters, an exchangeable electrode holder is used with the same outer diameter, but different inside diameters. The electrode holders contain expansion slits and a tapered part, with which they are pressed on the electrode. In the case of a WIG torch, a torch cap is screwed to the end of the torch body, which fastens the electrode within the adapter sleeve. With familiar torches, however, the centering of the electrode is difficult, because, as in the case with WIG torches, it has to be sighted in manually by the user, who simultaneously screws the torch cap on the torch body. So it can happen, that the electrode is not centered in the gas flow and can create detrimental flow conditions around the electrode. This causes the electrode to oxidize and to be consumed quicker by lower gas cooling or by forming turbulences with air intake.

These mechanical construction problems with familiar arcwelding or cutting torches can also lead to intermittent current conduction from the torch body or the torch housing to the electrode holder and from there to the electrode. For instance, this can cause different conditions during conduct of current after exchanging an electrode holder with the same inside diameter in a WIG torch, even after repointing and refastening the electrode. Sometimes this generates excessive transfer resistance between the electrode holder and the electrode and, consequently, high localized thermal loads on the electrode holder and unwanted heat transfer to the torch body and sometimes from there to the torch cap with the plastic covering.

SUMMARY OF THE INVENTION

Based on all this, the objective of the invention is to improve an arcwelding or cutting torch, so that it is easy to achieve a simple and defined adjustment of the electrode and thus a beneficial conduction of current between electrode holder and electrode.

To solve this problem, the invention provides, among other things, that the housing of the electrode holder contains a taper fit lock for the electrode holder, which has corresponding hub and slip planes, while an opposing thrust to the torch nozzle holds the electrode holder in the taper fit lock of the housing during assembly.

According to the invention, the electrode holder is kept in the taper fit lock of the housing or the torch body by an opposing thrust to the torch nozzle. This causes an automatic centering of the electrode holder and a simultaneous alignment of the electrode to the appropriate gas flow. Furthermore, this results in an extended contact between the electrode holder and the torch body or the housing of the electrode holder, which promotes good and especially definite conductivity of current to the electrode with low transfer resistance. This in turn creates a definite heat transfer from the electrode holder to the torch body, which again significantly increases the tool life of the electrode holder and, for WIG or Plasma torches, also of the electrode itself.

According to a first special design of the invention, the electrode holder is guided into the rear section of the housing, relative to the torch nozzle. This again improves the alignment of the electrode holder and thus also that of the electrode itself.

For this, a cylindrical section in the housing of the torch can serve as beneficial design feature in guiding the electrode holder.

Since during assembly the electrode holder is kept in the taper fit lock of the housing or the torch body with a opposed thrust to the torch nozzle, it is possible, especially with WIG and Plasma torches, to insert the electrode holder into the housing or the taper fit lock from the nozzle end of the torch. This simplifies the assembly of the torch significantly and likewise shortens the setup time.

According to the invention, the preferred method of securing it to the housing of the torch is for the electrode holder to have a screw on end opposite the torch nozzle. For ease of assembly, therefore, the electrode holder has a knurled section on the end towards the torch nozzle.

An alternate method, especially for WIG and Plasma torches, is to provide for a threaded section on the end of the electrode holder opposite the torch nozzle for screwing it to the torch cap.

A special suggestion of the invention provides, that the electrode holder and the housing form a circular chamber for the shielding gas or the plasma gas, which is then directed to the outside by lead channels that are aligned around the circumference of the electrode holder in the area of its hub and slip planes and extend along the injection jet axis towards the torch nozzle. A homogeneous and steady flow is even achieved in the area of the electrode holder through passages formed by the taper fit lock of the electrode holder and the lead channels extending along the injection jet axis. This promotes a better gas shielding of the melt and, by eliminating turbulences, better cooling of the critical active parts of the torch.

Other aims, advantages, features, and possible uses of the present invention will arise from the following description of two design examples through diagrams. Thus all described and/or graphically displayed features represent, by themselves or in any random combination, the object of the present invention, even independent of their claims summary or their relative connection.

BRIEF DESCRIPTION OF THE DRAWINGS

The following is shown in:

FIG. 1 a longitudinal diagram of a WIG torch with a possible electrode holder design, according to specifications of the invention, FIG. 2 the electrode holder corresponding to FIG. 1, FIG. 3 a longitudinal diagram of a different WIG torch with a further design of an electrode holder, according to specifications of the invention and FIG. 4 the electrode holder corresponding to FIG. 3.

DESCRIPTION OF THE PREFERRED EMBODIMENTS

The WIG torch in FIG. 1 contains a torch body 1, which, in the area of its connection at the torch neck 14, is attached to the electrical cable (not shown), the water flow pipe and the return pipe 15, 16, the flexible gas tube 23, and the control conduit (also not shown). The torch body 1 incorporates a housing 4 for accommodating an electrode holder 3, which holds the electrode 2. The front end of the torch body contains a torch nozzle 7 or gas jet. To promote a better dispersion of the shielding gas within the torch nozzle 7, the design example in FIG. 1 incorporates a gas lens 17, which generates a steadier gas flow and shields the welding joint better. On the end of the torch body 1 opposite the torch nozzle 7 there is a torch cap 9 covering the current conducting electrode 2.

The welding current for generating the arc between the electrode 2 and the work piece, is conducted from the electrode holder 3 to the electrode 2 by the electrical cable over conducting connectors of the torch body 1.

As seen in FIG. 1, the housing 4 of the torch body 1, or, in the selected design example, the heat dissipater 25, which is located between the jacket 24 of the torch body 1 and the electrode holder 3, contains a taper fit lock 5 for the electrode holder 3. The electrode holder 3 is designed with the appropriate hub and slip planes 6. The electrode holder 3 has a cylindrical section 8 on its back end, relative to the torch nozzle 7, with which it can be easily inserted into the housing 4 or the heat dissipater 25.

During the assembly of the torch, the electrode holder 3 is inserted into the housing 4 from the direction of the torch nozzle, after which the electrode 2 is aligned to the standard distance from the gas jet 7. Afterwards, just like for resinking the electrode 2 between the welding jobs, the torch cap 9 is screwed on, gripping with the outside threads 18 the inner threads 19 on the back end of the electrode holder 3 and pressing the electrode holder 3 with its hub and slip planes 6 into the taper fit lock 5 of the housing 4 or the heat dissipater 25. This causes the expansion slits 13 of the electrode holder 3 to contract, which tightens the electrode 2 within the electrode holder 3 or the adapter sleeve. The taper fit lock 5 of the electrode holder 3, with the help of the cylindrical guidance of the electrode holder 3 with its back section 8 inside the housing 4 or the heat dissipater 25, secures an automatic centering of the electrode holder 3 with central alignment of the electrode 2 to the gas flow. This also produces a definite and extended conductivity of current between the housing 4 and the electrode holder 3, which in turn results in beneficial conductivity with low transfer resistance to the electrode 2 and in improved cooling.

Furthermore, as seen in FIGS. 1 and 2, the electrode holder 3 and the housing 4 form a circular chamber 11. This circular chamber 11 has a flow connection to the lead channels 12, which are arranged around the circumference of the electrode holder 3 in the area of its hub and slip planes 6 and extend along the injection jet axis of the torch. It also connects to a reservoir 22, formed between the gas lens 17 and the housing 4. The lead channels 12 achieve a homogenous and steady flow of the shielding gas even before the gas lens 17 and thus assist in improved gas shielding of the melt.

FIGS. 3 and 4 represent a further design example of a torch for WIG welding. The same reference numbers are assigned to the active parts of the torch as in FIGS. 1 and 2, so that a detailed description can be eliminated. The essential difference of the torch in FIGS. 3 and 4, compared to the one described previously, consists of the fact, that the electrode holder 3 with its outside threads 20 can be screwed directly to the inside threads 21 of the housing 4 or the heat dissipater 25 of the torch body. To facilitate the assembly, the electrode holder 3 has a knurled section 10 on the end towards the torch nozzle 7. The supply of the inert gas proceeds concentrically in the torch body 1.

Of course, the invention is not limited to WIG torches, but can be applied advantageously also to Plasma torches as well as to MIG and MAG torches and their current conductive contact jet.

REFERENCE LIST

1—torch body
2—electrode
3—electrode holder
4—housing
5—taper fit lock
6—hub, slip plane
7—torch nozzle
8—cylindrical section
9—torch cap
10—knurled section
11—circular chamber
12—lead channel
13—expansion slit
14—torch neck
15—water flow pipe
16—water return pipe
17—gas lens
18—outside threads
19—inside threads
20—outside threads
21—inside threads
22—reservoir
23—flexible gas tube
24—jacket
25—heat dissipater

I claim:

1. An arc welding or cutting torch, comprising:

a torch body with a torch nozzle and a housing, said torch body having a forward end and a rearward end;

a taper fit lock mounted in said housing and defining an axial bore therethrough, said taper fit lock including a taper bore section and a cylindrical bore section disposed rearward of said tapered bore section;

a corresponding electrode holder comprising an elongated body with a holder rear end adapted to engage said housing and a hub having cooperating slip planes adapted to engage said taper fit lock of the housing, whereby said electrode holder is retained in said taper fit lock of said housing by an opposing thrust to said taper bore section;

said electrode holder slip planes having a frustoconical portion with rearwardly facing tapered surfaces adapted to engage said tapered bore section of said taper lock, and said electrode holder slip planes having a cylindrical portion disposed rearwardly adjacent said frustoconical portion and having outer surfaces adapted to engage said cylindrical bore section of said tapered lock, and said holder rear end generally aligned with said cylindrical portion of said electrode holder slip planes.

2. The torch of claim 1, wherein said taper fit lock opens forwardly of said housing, whereby aid electrode holder is inserted into the taper fit lock through the torch nozzle end of the torch body.

3. The torch of claim 1, wherein said holder rear end is cylindrical having external threads thereon adapted to engage internal threads in said housing, whereby said electrode holder is threadably secured onto the housing of the torch.

4. The torch of claim 3, wherein the electrode holder has a knurled section on an end facing the torch nozzle.

5. The torch of claim 1, wherein said electrode holder and said housing form an annular chamber for a shielding gas or a plasma gas, said annular chamber having lead channels that are aligned around the circumference of the electrode holder in the area of its hub and slip planes and extend along an injection jet axis of the torch towards the torch nozzle, said electrode holder having expansion slits which allow said holder to contract and tighten onto an electrode within said holder when said holder is secured within said housing, said slits being in fluid isolation from said chamber sufficient to promote gas shielding of the electrode and to promote cooling of the torch.

6. The torch of claim 1, wherein said electrode holder has threads which engage with threads on said housing, whereby said electrode holder is threadably securable onto the housing of the torch at an end opposite the torch nozzle.

* * * * *